No. 670,721. Patented Mar. 26, 1901.
W. B. MURPHY.
MANUFACTURE OF FASTENING DEVICES FOR GLOVES, &c.
(Application filed Aug. 3, 1899. Renewed May 10, 1900.)
(No Model.) 2 Sheets—Sheet 1.
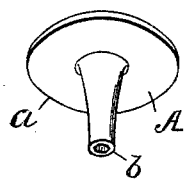
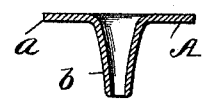
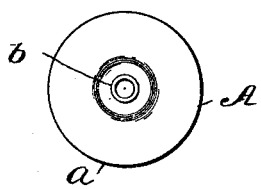
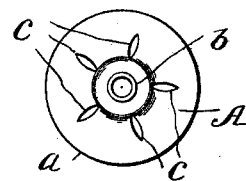
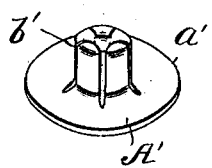
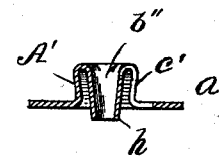
WITNESSES:
INVENTOR
William B. Murphy No. 670,721. Patented Mar. 26, 1901.
W. B. MURPHY.
MANUFACTURE OF FASTENING DEVICES FOR GLOVES, &c.
(Application filed Aug. 3, 1899. Renewed May 10, 1900.)
(No Model.) 2 Sheets—Sheet 2.
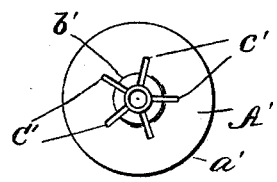
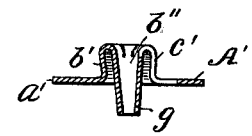
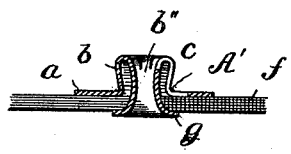
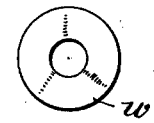
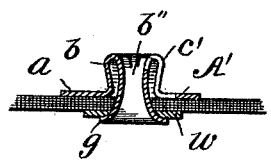
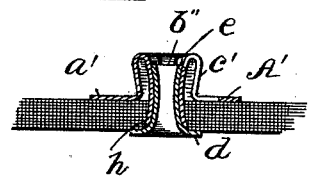
WITNESSES:
G. A. Taylor
Vincent P. Lynett
INVENTOR
William B. Murphy
THE NORRIS PETERS CO., PHOTO-LITHO., WASHINGTON, D. C.

UNITED STATES PATENT OFFICE.

WILLIAM B. MURPHY, OF NEW YORK, N. Y., ASSIGNOR TO LUCIUS N. LITTAUER, OF GLOVERSVILLE, NEW YORK.

MANUFACTURE OF FASTENING DEVICES FOR GLOVES, &c.

SPECIFICATION forming part of Letters Patent No. 670,721, dated March 26, 1901.

Application filed August 3, 1899. Renewed May 10, 1900. Serial No. 16,196. (No model.)

*To all whom it may concern:*

Be it known that I, WILLIAM B. MURPHY, a citizen of the United States, residing at the city of New York, in the county and State of New York, have invented a certain new and useful Improvement in the Manufacture of Fastening Devices for Gloves and other Articles, of which the following is a specification.

My improvement relates to the manufacture of the stud member of that class of fastening devices for gloves and other articles which are composed of a resilient or spring stud member and a rigid socket member adapted to receive and hold the stud member, the former being adapted to be attached to one flap and the latter to the other flap of the glove or other article, so that when the head of the resilient stud member is made to occupy the socket member the two flaps become firmly fastened together, but so that a ready disengagement is permitted, and my present improvement comprises a new and improved method of making the resilient or spring stud member for use in such relation; and the object of my present invention is to facilitate the manufacture of same.

In the accompanying drawings, Figure 1 is a view in perspective of the piece from which the stud is formed and made. Fig. 2 is a vertical sectional view of the same. Fig. 3 is a plan view of the same looking from above downward. Fig. 4 is a plan view of the same piece after apertures or slits have been cut therein, as hereinafter described. Fig. 5 is a view in perspective of the shape given to the piece by the first operation after the apertures or slits have been cut. Fig. 6 is a sectional view of the same. Fig. 7 is a sectional view of the piece after the next operation, showing it in condition for attachment to the fabric. Fig. 8 is a plan view of same looking from above downward. Fig. 9 is a sectional view of the stud shown in Fig. 8, attached to the fabric. Fig. 10 is a plan view of a washer. Fig. 11 is a view of the stud shown partly in section and attached to the fabric, the washer being used. Fig. 12 is a sectional view of the eyelet which may be used for attaching the stud to the fabric, and Fig. 13 is a sectional view of the stud attached to the fabric by means of said eyelet.

Similar letters of reference indicate similar parts.

The drawings are on a considerably-enlarged scale.

The piece A, Figs. 1, 2, and 3, from which the spring-stud is formed is struck up from sheet metal and is composed of the tubular part $b$ and the horizontal flange $a$, which should be in about the proportions shown in the drawings, and it will be noticed that the tubular portion $b$ tapers slightly as it recedes from the horizontal flange. The piece A being formed is placed in a press in which the radially-located slits or apertures $c$ are cut in the flange $a$ contiguous to the base of the tapering tube. (See Fig. 4.) I prefer to cut five or six of these apertures, preferably five; but there may be a greater number, if desired, though a greater number tends to weaken the stud, and there may be a fewer number, but a fewer number will tend to diminish the resiliency of the stud. After the slits or apertures $c$ are formed in the piece A the piece is then placed in another press and the horizontal flange portion is pressed in the direction of tube $b$, so as to cause the portion thereof contiguous to such tube to be drawn over and down to surround the tube and to form an annular head $A'$. (See Figs. 5 to 8.) In this drawing over of the portion of the flange next the tube the slits $c$ therein are drawn out or extended, so that the metal between the slits constitute the sides of what is to form a resilient head, a small portion of the slits $c'$, Fig. 5, still remaining in the horizontal flange $a'$, and there is also effected a slight drawing over inward and downward of the other or inward end of the slits. In Fig. 5 is shown the resulting stud member $A'$, with head $b'$ and interior tube or support $b''$. If the stud is intended to be attached to the fabric by means of an eyelet, Figs. 12 and 13, the tube should be drawn down, so that the end $h$, Fig. 6, will project below the flange $a'$ about the distance shown in Fig. 6. If, however, the stud is intended to be attached without an eyelet, then the piece A, Fig. 1, should be made with a longer tube and the tube should be drawn downward, so that the end $g$, Fig. 7, will project below the flange $a'$ about the distance shown in Fig. 7, so as to afford sufficient metal to be spread out on the under surface of the fabric and hold the stud in place, as shown in Figs. 9 and 11. The piece, Fig. 5, is then placed in another press, where the head is given a somewhat spherical form, which operation results in still further slightly narrowing and elongating the slits and drawing up the metal in the flange adjacent to the spherical head and drawing over inward and downward a portion of the metal between the slits, thereby increasing the resiliency of the head and also the firmness of the spherical head without impairing its resiliency, or this operation may be performed in the same press as that in which the tube is drawn down or by the same operation. By the above method of operation the forms shown in Figs. 6 and 7 are finally obtained, having the head $b'$, made resilient by vertical slits $c'$, a flanged base $a'$, integral with the lower end of the head $b'$, a centrally-located interior tube $b''$ and depending therefrom, said tube serving as a support for the resilient head.

When the piece has reached the condition shown in Figs. 6 or 8, it is ready for attachment to the fabric. This attachment is performed by first perforating the fabric with a hole only sufficiently large to allow the passage therethrough of that portion $g$, Fig. 7, of the tube $b''$ which projects below the plane of the under side of the flange $a'$. This portion of the tube is then passed through the hole in the fabric until the lower side of the flange $a'$ of the stud rests upon the upper side of the fabric, when by means of a tool or press operating within the downwardly-projecting portion of the tube (indicated at $g$ in Fig. 7) the tube is spread outwardly, so as to contact with the under surface of the fabric in the manner shown in Fig. 9, where $f$ represents the fabric, and $g$ the spread-out tubular portion, or a washer $w$, Fig. 10, may be laid on the under side of the fabric, the tube passing through the aperture therein, and the lower part $g$, Fig. 8, of the tube $b''$ may be spread out upon the washer $w$, as shown in Fig. 11. When formed and attached in this manner, the stud, including the flange on the upper side of the fabric, whereby the resilient head is firmly seated upon the fabric, the resilient head itself, and the flange on the under side of the fabric, whereby the stud is attached to the fabric, is composed, as seen, of a single piece or a single piece and a washer, and the assembling together and nice adjustment of several parts is consequently obviated, or instead of securing the stud in the manner just described I may use the eyelet shown in section in Fig. 12. This eyelet has the flanged portion $d$ and the tubular portion $e$, which tubular portion is small enough in diameter to enter the downwardly-projecting tubular portion $h$ of the tube $b''$, as shown in Figs. 6 and 13, and should be of such length as to penetrate the tube $b''$, Figs. 6 and 13, so that the top of the tube $e$ of the eyelet may be spread outwardly and occupy the wider portion of the tube $b''$, Figs. 6 and 13. The stud having been formed and shaped as shown in Figs. 6 and 13 and placed upon the fabric, the lower depending portion of the tube $b''$ having been passed through the hole in the fabric formed as and for the purpose just before described, the eyelet, Fig. 12, is then applied, so that the tubular part $e$ of the eyelet is passed upward within the downwardly-depending part $h$ of the tube $b''$, Figs. 6 and 13, so that the top of the part $e$ of the eyelet will be well within the wider part of the downwardly-projecting tube $b''$ and so that the flange $d$ of the eyelet lies against the under side of the fabric. Then by means of a suitable press the upper part of the tubular part $e$ of the eyelet is spread within the enlarged area of the tube $b''$, so that the eyelet cannot be withdrawn from the stud. (See Fig. 13.) This method of attaching the eyelet gives a desirable finish to the under portion of the fabric and at the same time secures the stud to the fabric and is the method of attaching the stud which I prefer, although it involves the use of one additional piece. It is obvious that the extent to which the tube $b''$ will project downwardly will depend to a considerable degree upon the thickness of the fabric. It may also be made so as not to project downwardly below the plane of the upper surface of the fabric in case an eyelet is intended to be used; but I prefer to construct the stud in the manner shown, as greater firmness is thereby obtained.

The interior tube $b''$, especially when reinforced by the tubular portion of the eyelet, (see Fig. 13,) affords a firm support for the exterior slitted portion of the stud and effectually secures the same against distortion by blows. The slits in the sides of the spherical head terminating in the horizontal flange $a$ and extending over the top of the head somewhat into the interior gives to the stud all desirable resiliency, and the labor and difficulty of assembling small parts together and nicely adjusting them are entirely avoided or reduced to assembling two parts at the most.

I do not claim in this application the stud described herein as made by my improved method, but I wish it to be understood that I reserve the same as subject-matter for a separate application.

I claim as new—

The method of making a spring-stud intended for engagement with a rigid socket, consisting in forming a piece with a flaring tubular portion and a flange at one end thereof, slitting the said flange radially therein and near the said tubular portion, drawing the said slitted portion of the flange over and around the tubular portion to form an annular head, while elongating said slits, and leaving the metal portions, between the slits, resilient, and allowing the tubular portion to remain.

WILLIAM B. MURPHY.

Witnesses:
G. A. TAYLOR,
VINCENT P. LYNOTT.